United States Patent [19]
Katoot

[11] Patent Number: 5,834,540
[45] Date of Patent: Nov. 10, 1998

[54] PROCESS AND COMPOSITION FOR SOIL REMEDIATION

[75] Inventor: Mohammad W. Katoot, Roswell, Ga.

[73] Assignee: KT Holdings, LLC, Tucker, Ga.

[21] Appl. No.: 723,141

[22] Filed: Oct. 1, 1996

[51] Int. Cl.⁶ .................................................. C08K 5/3415
[52] U.S. Cl. ............................ 524/104; 524/503; 525/57
[58] Field of Search ..................................... 524/503, 557, 524/104; 525/57

[56] References Cited

U.S. PATENT DOCUMENTS

| | | | |
|---|---|---|---|
| 4,632,742 | 12/1986 | Tundo ................................ | 204/158.21 |
| 5,100,952 | 3/1992 | Hoskin et al. .......................... | 524/503 |
| 5,205,999 | 4/1993 | Willis et al. ............................. | 423/20 |
| 5,278,213 | 1/1994 | Han ......................................... | 524/233 |
| 5,370,477 | 12/1994 | Bunin et al. ............................ | 405/128 |
| 5,449,519 | 9/1995 | Wolf ....................................... | 424/401 |
| 5,583,169 | 12/1996 | Wrobleski et al. ..................... | 524/99 |

FOREIGN PATENT DOCUMENTS

| | | |
|---|---|---|
| 1539307 A1 | 1/1990 | U.S.S.R. . |
| 2145420 | 3/1985 | United Kingdom . |
| WO 95/00681 | 1/1995 | WIPO . |

*Primary Examiner*—Paul R. Michl
*Attorney, Agent, or Firm*—Jones & Askew

[57] ABSTRACT

Compositions and methods are provided for the decontamination of waste matter, in particular for soil remediation. The methods include making and applying a polymer composition to waste matter and subjecting the waste matter and polymer composition to radiation, preferably microwave radiation.

21 Claims, No Drawings

PROCESS AND COMPOSITION FOR SOIL REMEDIATION

CROSS REFERENCE TO PRIOR APPLICATION

This application claims priority to U.S. Provisional Patent application Ser. No. 60/004,758 filed Oct. 2, 1995.

TECHNICAL FIELD

This invention relates to a composition and process for the remediation of contaminated materials, and in particular for soil remediation. The present invention relates to compositions and processes that cause the breakdown of unwanted contaminates, such as hydrocarbon wastes. The invention relates to the further use of radiation, preferably microwave radiation, to effect the degradation of contaminates. The present invention is equally effective in treating materials that have been exposed to harmful or infectious biological contaminates.

BACKGROUND OF THE INVENTION

A major problem in the world today is the contamination of materials, such as soil, by a wide variety of undesirable or toxic wastes. These wastes include various hydrocarbons including fossil fuels such as oil, gasoline, diesel, kerosene and the like, wastes from manufacturing, radioactive wastes, and biological contaminates. The cost of cleaning up these materials or sites runs into the billions of dollars.

Much of these wastes are currently being collected and then burned or encapsulated away from the site of contamination. These prior art methods are unsatisfactory in that they are expensive and cause their own contamination problems. For example, if the wastes are burned, they may not be burned completely and harmful byproducts may be released into the atmosphere. Encapsulation methods may alleviate the problem in the short term, but the wastes may continue to be released over time.

Excavation and disposal of contaminated soil in landfills is also becoming increasingly restricted by law. In some contaminated soil cases, such as contamination caused by tank leaks in urban or industrial areas, excavation is very expensive and sometimes even impossible without causing damage to surrounding structures. In situ treatment methods have distinct advantages over these methods in that they avoid extensive excavation costs and increase safety during treatment.

Existing in situ treatment methods involve heating soil with electromagnetic energy radiated from an antenna placed in a wellbore in the ground. Reliance on such thermal radiation wellbore techniques alone, however, is limited by 1) the cylindrical attenuation of the field power strength for each well, 2) exponential decay due to soil penetration depth, and 3) the use of extremely high energy electromagnetic radiation due to the ineffectiveness of ordinary radiation on hydrocarbons or non-polar contaminants. The resulting non-uniformity of soil heating causes limitations on well materials, overheating problems at particular wellbore sites, and poor application efficiency of the electromagnetic energy as well as very high cost and inherent dangers of generating high energy radiation. An example of in situ microwave radiation technology can be found in U.S. Pat. No. 5,370,477, the contents of which are hereby incorporated by reference.

A vacuum extraction method can also be used to remove contamination from the ground. This method, however, is only effective for a narrower range of contaminates than thermal treatment methods are, and it entails very long treatment times (up to years) which are difficult to predict, further complicated by variable weather. In this method, only contaminates with relatively high vapor pressures are removed. Low vapor pressure fractions of these materials are left behind. Materials such as diesel fuel, for example, constitute a variety of compounds with both high and low vapor pressures. Vacuum extraction, therefore, will unsatisfactorily selectively remove only the high vapor pressure fraction of contamination and leave behind high molecular weight, low vapor pressure materials.

What is needed is a composition and method of treating wastes more effectively and efficiently. Such compositions and methods should be capable of administration at the site of contamination. In addition, the compositions and methods should reduce the wastes to non-toxic products. Furthermore, the compositions and methods should be generally applicable to decontaminate a wide variety of wastes contained within a wide variety of carriers. The decontamination of wastes associated with a carrier, such as soil, should then render the carrier safe and reusable.

Accordingly, it is an object of the present invention to provide a composition and method for treating contaminated materials, such as soil.

It is further an object of the present invention to provide a composition and method for treating contaminated materials in situ.

It is further an object of the present invention to provide a composition and method for decomposing contaminated materials by subsequent exposure to radiation, such as microwave radiation.

It is further an object of the present invention to provide a composition and method for decomposing contaminated materials which renders associated carriers of the waste materials reusable.

SUMMARY OF THE INVENTION

The present invention provides a method and composition for decontamination, including soil remediation, that is inexpensive when compared to prior art methods of treating contaminated wastes and converts the wastes to non-toxic products. The present invention also provides a method and composition that allows the wastes to be treated on site, and permits the reuse of associated carriers.

The present invention provides a remediation composition that can be added to the contaminated soil or other material in situ. The admixture can then be exposed to microwave radiation. The microwaves cause the composition to decompose and subsequently alter the contaminates in the soil or other material to render non-toxic byproducts. For example, when treating contaminated soil, the contaminated soil can be removed and admixed with the remediation composition of the present invention and then exposed to microwave radiation, or the composition of the present invention can be added directly to the soil in situ and then exposed to microwave radiation.

These and other objects, features and advantages of the present invention will become apparent after a review of the following detailed description of the disclosed embodiment.

DETAILED DESCRIPTION OF THE INVENTION

The present invention provides compositions and methods for inexpensively and efficiently treating waste matter. By "treating" waste matter is meant at least partially decomposing the waste matter into a simpler molecular structure. By "waste matter" is meant any contaminate which may be decomposed upon application of the present polymer compositions and subsequent irradiation. The waste matter may be alone or associated with other materials, such as soil or garments.

For example, the remediation polymer composition of the present invention can be added directly to soil, or other contaminated materials, with hydrocarbon wastes (e.g. fossil fuels), or the contaminated soil can be excavated and admixed with the polymer composition away from the site. The admixture can then be exposed to radiation, thereby causing the hydrocarbon contaminate to be decomposed to non-toxic substances such as water, carbon and carbon dioxide. The invention contemplates that various forms of radiation may be applied to treat waste matter, however, microwave radiation is preferred. According to the present invention, the waste carrier itself, such as soil, can then be remediated for future use.

The present invention can also be used to destroy biologically contaminated materials, such as materials that come into contact with patients. These include sheets, gowns, bandages, surgical gauze and the like. Such biologically contaminated materials can preferably be treated with the compositions and methods of the present invention away from the patient.

The present invention can also be used to remediate other types of hazardous waste, such as heavy metals or chlorinated compounds, by altering the matrix of the polymer. For example, where chlorinated compounds are the contaminant, sodium can be attached to the side chains of the polymer, and once activated by microwave radiation, for example, energy is provided to affect the coupling of sodium to chlorine, producing harmless salts.

The invention provides a process for making a composition for treating waste matter comprising, combining a polyaniline solution and a polyvinyl alcohol solution to form a polyaniline/polyvinyl alcohol solution. Furthermore, the process provides combining the polyaniline/polyvinyl alcohol solution with a peroxide, thereby making a composition for treating waste matter. A variety of peroxides can be used, such as hydrogen peroxide, benzoil peroxide, or others; however hydrogen peroxide is preferred. In preferred embodiments, approximately about an equal volume of hydrogen peroxide can be used.

The invention further provides that the polyvinyl alcohol solution can be made by combining polyvinyl alcohol and a glycol. A variety of glycols can be used, such as ethylene glycol, propylene glycol, or others; however, ethylene glycol is preferred. The glycol can be diluted by about 50% water by volume. Preferably, about 50% by weight of polyvinyl alcohol can be combined with the dilute ethylene glycol.

The invention further provides that the polyaniline can be prepared by combining a salt, such as ammonium persulfate for example, and a first acid to form a pre-polymer solution, combining aniline and a second acid to form an aniline solution, then combining the pre-polymer solution and the aniline solution to form a polyaniline solution, and precipitating the polyaniline. The salt can be selected from a variety of diatomic or larger organic salts, for example. A variety of first and second acids can be, for example, hydrochloric acid, sulfuric acid or others; however, hydrochloric acid is preferred.

The invention further provides that in preferred embodiments about 1 g to 50 g, preferably about 5 g to 25 g, preferably about 12 g, of an oxidizer, such as ammonium persulfate, can be combined with 250 ml of 1M hydrogen chloride to make a pre-polymer solution. Furthermore, about 1 ml to 50 ml, preferably about 10 ml to 30 ml, preferably about 21 ml, of aniline can be mixed with 300 ml of 1M hydrogen chloride to make an aniline solution.

The invention further provides that the polyaniline can be precipitated by cooling the polyaniline solution to about 0 degrees Celsius for about 20 to 300 minutes, preferably about 60 minutes, raising the polyaniline solution to about 4 to 15 degrees Celsius, preferably about 9 degrees Celsius for about 5 to 30 minutes, preferably about 15 minutes, and cooling the polyaniline solution to about 0 degrees Celsius for about 15 to 90 minutes, preferably about 45 minutes. The polyaniline can be further precipitated by drying under vacuum at about 50 degrees Celsius.

The invention further provides that the polyaniline solution can be made by combining polyaniline and an acid. The acid can be selected from a variety of acids, for example, sulfuric acid or hydrochloric acid; however, sulfuric acid is preferred. In an alternative embodiment, the polyaniline solution can be made by combining polyaniline and an oxidizing salt. Preferably, the salt can be lithium perchlorate, copper perchlorate or ammonium persulfate, for example.

The invention further provides that about 1% to about 30%, preferably about 10%, by weight of the polyvinyl alcohol solution can be combined with the polyaniline solution to form the polyaniline/polyvinyl alcohol solution. Furthermore, about an equal volume of about 30% by volume hydrogen peroxide can be combined with the polyaniline/polyvinyl alcohol solution to form one embodiment of the composition for treating waste matter.

In an alternative embodiment, the invention further provides a process for making a composition for treating waste matter comprising, combining polyaniline and a base, adding N-methyl pyrrolidone to saturation to form a polyaniline solute. Thereafter, the embodiment provides combining the polyaniline solute and a polyvinyl alcohol solution to form a polyaniline/polyvinyl alcohol solution, and combining the polyaniline/polyvinyl alcohol solution with an acid. Thereafter, the method provides combining the acidic polyaniline/polyvinyl alcohol solution with peroxide. In preferred embodiments approximately about an equal volume of hydrogen peroxide can be used, thereby making a composition for treating waste matter. In one embodiment, the acid can be sulfuric acid combined at about 25% by volume.

The invention provides a variety of compositions for treating waste matter made by the above described processes. The invention provides methods of treating waste matter comprising applying any of the compositions to waste matter, and subjecting the waste matter to radiation. The invention provides that the waste matter can be a hydrocarbon molecule, a fossil fuel derivative, or a microorganism, for example. The invention contemplates that the waste matter can be associated with a reclaimable carrier. The reclaimable carrier can be for example gravel, sand, soil, sludge and clay. The invention further contemplates that the carrier can be a garment, sheets, towels, drapes, wraps, wipes, bandages or surgical gauze, for example.

The invention provides that the radiation can be microwave radiation. Microwave radiation can be projected at about 0.1 to 10 Ghz, preferably about 1 Ghz, and 1–1000 watts for about 5–300 seconds. The invention provides that the waste matter can be subjected to radiation in situ, by methods well known to those in the field. Different compositions of the present invention may be better suited to forms of radiation other than microwaves. The preferred type and duration of radiation will depend upon the circumstances of each case, such as the polymer composition and size of the sample of waste matter, which is routinely determinable given the present disclosure.

The invention provides that an amount of the composition sufficient to saturate the waste matter can preferably be applied to the waste matter. For example, about 1 ml to 20 ml, preferably about 10 ml, of the composition can be applied to every about 100 g of waste matter. The preferred amount of composition will depend upon the circumstances of each case, such the type and amount of waste matter, which is routinely determinable given the present disclosure. The invention provides that the composition can be applied to the carrier and waste matter in situ.

This invention is further illustrated by the following examples, which are not to be construed in any way as imposing limitations upon the scope thereof. On the contrary, it is to be clearly understood that resort may be had to various other embodiments, modifications, and equivalents thereof, which, after reading the description herein, may suggest themselves to those skilled in the art without departing from the spirit of the present invention.

Example I

To produce one embodiment of the remediation polymer of the present invention, a prepolymer solution was prepared by dissolving 12 g ammonium persulfate in 250 ml of 1M HCl. The solution was then placed in a three necked flask, purged with nitrogen and cooled to 5° C. In a separate container, 21 ml of distilled aniline was mixed with 300 ml of 1M HCl. The container was purged with pure nitrogen. The aniline solution was then added to the 3 necked flask. The mixture was cooled to about 0° C. and stirred for about 60 minutes. The temperature of solution was then raised to about 8° to 10° C. for about 15 minutes. The solution was then cooled to about 0° C. and stirred for about 45 minutes. The polyaniline precipitate was then washed several times by filtration with distilled water.

The precipitate was then dried under vacuum at about 50° C. for at least about 12 hours. To remove all of the residual HCl, pieces of cellulose were added to the prepolymer solution and the mixture was stirred for several hours. The cellulose was then removed by filtration and polyaniline was dried under vacuum at a temperature of approximately 50° C. Enough of the polyaniline was added to concentrated sulfuric acid until a saturated solution was prepared. Another solution was prepared by dissolving about 50% by weight of polyvinyl alcohol in a solution of about 50% water and about 50% ethylene glycol by volume. About 10% by weight of the polyaniline solution was then added to the polyvinyl alcohol solution. Finally, approximately an equal volume of about 30% hydrogen peroxide was added to the polyvinyl alcohol/polyaniline solution. The resulting composition contained one formulation of the remediation polymer of the present invention.

Example II

The same steps performed as in Example 1, except the polyaniline was base treated with 1M potassium hydroxide for 12 hours at room temperature. The resulting product was dissolved in N-methylpyrrolidone (NMP) to saturation. The solute was then added to the polyvinyl alcohol solution and concentrated sulfuric acid was added at about 25% by volume. The resulting polyaniline/polyvinyl alcohol solution was added to approximately an equal volume of about 30% hydrogen peroxide. The resulting composition contained one formulation of the remediation polymer of the present invention.

Example III

The same steps performed as in Examples I or II, but instead of sulfuric acid, concentrated hydrochloric acid was added in the same volume percent. The resulting composition contained one formulation of the remediation polymer of the present invention.

Example IV

The same steps performed as in Examples I and II, but instead of sulfuric acid, various concentrations of oxidizers were used, i.e., lithium perchlorate, copper perchlorate, and ammonium persulfate. The resulting composition contained additional formulations of the remediation polymer of the present invention.

Example V

The soil contaminated with waste water to be treated was thoroughly saturated with the remediation polymer. A typical addition of remediation polymer was 10 ml of remediation polymer to approximately 100 grams of soil that was contaminated, for example, with fuel oil contamination. It is to be understood that the final addition will be dependent upon the amount of contamination in the soil, the type of soil, i.e., sandy soil versus clay, and the type of contamination in the soil. The mixture was then exposed to microwave radiation (1 Ghz, 10 watts) for 10 seconds. The resulting residue was carbon, carbon dioxide and water.

Example VI

A cellulose hospital gown contaminated with blood was thoroughly soaked in the remediation polymer from Example I. The gown was then exposed to microwave radiation until the gown had completely disintegrated. The remaining residue was carbon.

Examples VII–X

A complete organic scan was performed by BTR Labs (Orlando, Fla.) on the samples described in Examples VII–X. The results are shown in Tables I–XI, which include all identified and unknown components in each sample. The samples were extracted using a non-polar solvent system and sonication extraction (U.S. EPA Method 3550). The extracts were then concentrated and analyzed by gas chromatography/mass spectroscopy (U.S. EPA Method 8270). The estimated detection limit for each component in these samples was approximately 0.1 $\mu$g/kg dry weight. The analyses results are estimated $\mu$g/kg concentrations based on 1:1 response with an internal standard.

Example VII

Sand contaminated with kerosene (10 weight %) was analyzed by gas chromatography/mass spectroscopy. The results of an 11.0 g untreated sample analysis are shown in Table I.

TABLE I

Kerosene + Sand

| Parameter Name | Analysis Result (μg/kg) | Scan Number | Date Extracted | Date Analyzed |
|---|---|---|---|---|
| Unknown | 120 | 996 | 12/05/95 | 12/06/95 |
| Nonane, 4,5-dimethyl | 396 | 1084 | 12/05/95 | 12/06/95 |
| Unknown | 242 | 1168 | 12/05/95 | 12/06/95 |
| Cyclohexanol, dodecyl | 588 | 1244 | 12/05/95 | 12/06/95 |
| Octane, 1,1-oxybis | 204 | 1282 | 12/05/95 | 12/06/95 |
| Benzene, 1-methyl-4-(phenylmethyl) | 150 | 1320 | 12/05/95 | 12/06/95 |
| 2(1H)-Naphthalenone, octahydro-4a,7,7,trimethyl, trans | 38.2 | 1389 | 12/05/95 | 12/06/95 |
| Anthracene, 2-methyl | 206 | 1454 | 12/05/95 | 12/06/95 |
| Pentatriacontane | 197 | 1514 | 12/05/95 | 12/06/95 |
| 1-tridecanol | 129 | 1574 | 12/05/95 | 12/06/95 |
| Unknown | 71.2 | 1631 | 12/05/95 | 12/06/95 |

The kerosene contaminated sand was treated with 1 cc of the remediation polymer composition of the present invention as made in Example I, followed by one minute of microwave radiation (1 Ghz, 10 watts). The analysis of an 11.9 g sample of the resulting product is shown in Table II.

TABLE II

Kerosene + Sand, Polymer 1 cc, MW High, 1 Min

| Parameter Name | Analysis Result (μg/kg) | Scan Number | Date Extracted | Date Analyzed |
|---|---|---|---|---|
| Naphthalene, 1,6-dimethyl | 5.8 | 1081 | 12/05/95 | 12/06/95 |
| Unknown | 44.7 | 1165 | 12/05/95 | 12/06/95 |
| Unknown | 74.0 | 1241 | 12/05/95 | 12/06/95 |
| Unknown | 26.3 | 1281 | 12/05/95 | 12/06/95 |
| Unknown | 91.6 | 1313 | 12/05/95 | 12/06/95 |
| 1-Tridecanol | 83.2 | 1385 | 12/05/95 | 12/06/95 |
| Unknown | 25.3 | 1447 | 12/05/95 | 12/06/95 |
| Decane, 1-(ethenyloxy)- | 61.6 | 1512 | 12/05/95 | 12/06/95 |
| Tetracontene, 3,4,24-trimethyl | 41.8 | 1575 | 12/05/95 | 12/06/95 |
| Dotriacontane | 24.0 | 1629 | 12/05/95 | 12/06/95 |
| Unknown | 10.9 | 1688 | 12/05/95 | 12/06/95 |

The kerosene contaminated sand was also treated with 2 cc of the remediation polymer composition of the present invention as made in Example I, followed by 5 minutes of microwave radiation (1 Ghz, 10 watts). The analysis of an 11.4 g sample of the resulting product is shown in Table III.

TABLE III

Kerosene + Sand, Polymer 2 cc, MW High, 5 Min

| Parameter Name | Analysis Result (μg/kg) | Scan Number | Date Extracted | Date Analyzed |
|---|---|---|---|---|
| Unknown | 12.4 | 1165 | 12/05/95 | 12/06/95 |
| Cyclohexanol, dodecyl | 2.8 | 1243 | 12/05/95 | 12/06/95 |
| Unknown | 9.9 | 1280 | 12/05/95 | 12/06/95 |
| 1-Tridecanol | 40.1 | 1313 | 12/05/95 | 12/06/95 |
| Unknown | 47.8 | 1385 | 12/05/95 | 12/06/95 |
| Unknown | 47.7 | 1449 | 12/05/95 | 12/06/95 |
| Hexadecane, 1-ethenyloxy | 36.5 | 1515 | 12/05/95 | 12/06/95 |

TABLE III-continued

Kerosene + Sand, Polymer 2 cc, MW High, 5 Min

| Parameter Name | Analysis Result (μg/kg) | Scan Number | Date Extracted | Date Analyzed |
|---|---|---|---|---|
| Tetracontane, 3,4,24-trimethyl | 23.8 | 1575 | 12/05/95 | 12/06/95 |
| Cyclohexanol, dodecyl | 13.9 | 1632 | 12/05/95 | 12/06/95 |
| Unknown | 7.2 | 1688 | 12/05/95 | 12/06/95 |

These analyses show a significant decrease in the amount of contaminates in the starting sample of Table I to the products in Tables II and III resulting from treatment of the contaminated samples with the composition and methods of the present invention.

Example VIII

Sand contaminated with diesel gas (11.8 Wt %) was analyzed by gas chromatography/mass spectroscopy. The results of an 11.2 g untreated sample analysis are shown in Table IV.

TABLE IV 11.8 Wt % of Diesel Gas in Sand

| Parameter Name | Analysis Result (μg/kg) | Scan Number | Date Extracted | Date Analyzed |
|---|---|---|---|---|
| Unknown | 287 | 802 | 12/05/95 | 12/06/95 |
| Nonane 4,5-dimethyl | 397 | 903 | 12/05/95 | 12/06/95 |
| Decane, 1,1'-oxybis | 189 | 998 | 12/05/95 | 12/06/95 |
| Pentatriacontane | 549 | 1084 | 12/05/95 | 12/06/95 |
| Unknown | 547 | 1165 | 12/05/95 | 12/06/95 |
| 2(1H)-Naphthale-trimethyl-trans, | 344 | 1381 | 12/05/95 | 12/06/95 |
| Unknown | 88.3 | 1449 | 12/05/95 | 12/06/95 |
| Unknown | 195 | 1513 | 12/05/95 | 12/06/95 |
| Hexadecane, 1-(ethenyloxy) | 138 | 1575 | 12/05/95 | 12/06/95 |
| Unknown | 82.3 | 1632 | 12/05/95 | 12/06/95 |
| Unknown | 48.0 | 1685 | 12/05/95 | 12/06/95 |

The diesel contaminated sand was treated with 1 cc of the remediation polymer composition of the present invention as made in Example I, followed by 2 minutes of microwave radiation (1 Ghz, 10 watts). The analysis of an 11.0 g sample of the resulting product is shown in Table V.

TABLE V 11.8 Wt % of Diesel Gas in Sand, Polymer 1 cc High MW 2 Min

| Parameter Name | Analysis Result (μg/kg) | Scan Number | Date Extracted | Date Analyzed |
|---|---|---|---|---|
| Naphthalene, 1,5-dimethyl | 5.2 | 1081 | 12/05/95 | 12/06/95 |
| Unknown | 66.7 | 1165 | 12/05/95 | 12/06/95 |
| Unknown | 123 | 1242 | 12/05/95 | 12/06/95 |
| Unknown | 43.8 | 1282 | 12/05/95 | 12/06/95 |
| Unknown | 183 | 1316 | 12/05/95 | 12/06/95 |
| Unknown | 190 | 1385 | 12/05/95 | 12/06/95 |
| Unknown | 191 | 1454 | 12/05/95 | 12/06/95 |

TABLE V-continued 11.8 Wt % of Diesel Gas in Sand,
Polymer 1 cc High MW 2 Min

| Parameter Name | Analysis Result (μg/kg) | Scan Number | Date Extracted | Date Analyzed |
| --- | --- | --- | --- | --- |
| Decanedioic acid, didecyl ester | 158 | 1515 | 12/05/95 | 12/06/95 |
| Unknown | 120 | 1575 | 12/05/95 | 12/06/95 |
| Unknown | 74.4 | 1632 | 12/05/95 | 12/06/95 |
| Unknown | 46.8 | 1689 | 12/05/95 | 12/06/95 |
| Unknown | 25.4 | 1746 | 12/05/95 | 12/06/95 |

The diesel contaminated sand was also treated with 2 cc of the remediation polymer composition of the present invention as made in Example I, followed by 5 minutes of microwave radiation (1 Ghz, 10 watts). The analysis of an 9.56 g sample of the resulting product is shown in Table VI.

TABLE VI 11.8 Wt % of Diesel Gas in Sand,
Polymer 2 cc High MW 5 Min

| Parameter Name | Analysis Result (μg/kg) | Scan Number | Date Extracted | Date Analyzed |
| --- | --- | --- | --- | --- |
| Unknown | 1.9 | 1240 | 12/05/95 | 12/06/95 |
| Tridecane 7-cyclohexyl-,7-cyclo-xexyl | 3.0 | 1313 | 12/05/95 | 12/06/95 |
| Unknown | 3.5 | 1385 | 12/05/95 | 12/06/95 |
| Unknown | 0.6 | 1448 | 12/05/95 | 12/06/95 |
| Unknown | 3.7 | 1514 | 12/05/95 | 12/06/95 |
| Unknown | 3.1 | 1574 | 12/05/95 | 12/06/95 |
| Tridecane 6-cyclohexyl-,6-cyclohexyl | 2.2 | 1632 | 12/05/95 | 12/06/95 |
| Unknown | 1.6 | 1688 | 12/05/95 | 12/06/95 |

These analyses show a significant decrease in the amount of contaminates in the starting sample of Table IV to the products in Tables V and VI resulting from treatment of the contaminated samples with the composition and methods of the present invention.

Example IX

A sample of sludge from Charleston, S.C. was analyzed by gas chromatography/mass spectroscopy for contaminates. The results of a 13.0 g untreated sample analysis are shown in Table VII.

TABLE VII

Charleston Sludge, Not Dried

| Parameter Name | Analysis Result (μg/kg) | Scan Number | Date Extracted | Date Analyzed |
| --- | --- | --- | --- | --- |
| 2(1H)-Naphthaleone-octahydro-4a 7,7-trimethyl-, trans | 0.3 | 1119 | 12/05/95 | 12/06/95 |
| Unknown | 2.1 | 1227 | 12/05/95 | 12/06/95 |
| Unknown | 0.7 | 1321 | 12/05/95 | 12/06/95 |

A 19.0 g sample of Charleston sludge was microwave dried and analyzed, the results of which are given in Table VIII.

TABLE VIII

Charleston Sludge, MW Dried

| Parameter Name | Analysis Result (μg/kg) | Scan Number | Date Extracted | Date Analyzed |
| --- | --- | --- | --- | --- |
| 1H-Indene, octahydro-2,2,4,4,7,7-hexamethyl-,trans | 0.3 | 1119 | 12/05/95 | 12/06/95 |
| cholestan-3-ol,2 methylene-, (3 beta, 5 alpha) | 0.7 | 1281 | 12/05/95 | 12/06/95 |
| Unknown | 1.6 | 1322 | 12/05/95 | 12/06/95 |
| Unknown | 0.9 | 1393 | 12/05/95 | 12/06/95 |

The Charleston sludge was treated with 8 cc of the remediation polymer composition of the present invention as made in Example I, and subjected to 2 minutes of microwave radiation (1 Ghz, 10 watts). The analysis of a 20.5 g sample of the resulting product is shown in Table IX.

TABLE IX

Charleston Sludge, MW Dried,
Polymer 8 cc, MW 2 Min

| Parameter Name | Analysis Result (μg/kg) | Scan Number | Date Extracted | Date Analyzed |
| --- | --- | --- | --- | --- |
| No significant peaks identified | | | 12/05/95 | 12/06/95 |

These analyses show a significant decrease in the amount of contaminates in the starting sample of Table VIII to the products in Table IX resulting from treatment of the contaminated samples with the composition and methods of the present invention.

Example X

A sample of sludge from Pensacola, Fla. was taken and analyzed by gas chromatography/mass spectroscopy. The results of a 20.2 g untreated sample analysis are shown in Table X.

TABLE X

Pensacola Sludge, Untreated

| Parameter Name | Analysis Result (μg/kg) | Scan Number | Date Extracted | Date Analyzed |
| --- | --- | --- | --- | --- |
| Fluoranthene | 3.1 | 1555 | 12/05/95 | 12/06/95 |
| Pyrene | 2.7 | 1588 | 12/05/95 | 12/06/95 |

The Pensacola sludge was treated with 4 cc of the remediation polymer composition of the present invention as made in Example I followed by two 2 minute doses of microwave radiation (1 Ghz, 10 watts). The analysis of an 20.5 g sample of the resulting product is shown in Table XI.

TABLE XI

Pensacola Sludge, Polymer 4 cc,
High MW 2 Min + 2 Min

TABLE XI-continued

| Parameter Name | Analysis Result (μg/kg) | Scan Number | Date Extracted | Date Analyzed |
|---|---|---|---|---|
| No significant peaks identified | | | 12/05/95 | 12/06/95 |

These analyses show a significant decrease in the amount of contaminates in the starting sample of Table X to the product in Table XI resulting from treatment of the contaminated samples with the composition and methods of the present invention.

It should be understood, of course, that the foregoing relates only to preferred embodiments of the present invention and that numerous modifications or alterations may be made therein without departing from the spirit and the scope of the invention.

I claim:

1. An aqueous composition for treating waste matter made by the process comprising:

combining polyaniline and a base;

adding N-methyl pyrrolidone to saturation to form a polyaniline solute;

combining the polyaniline solute and an aqueous polyvinyl alcohol solution to form an aqueous polyaniline/polyvinyl alcohol solution;

combining the polyaniline/polyvinyl alcohol solution with an acid; and combining the acidic polyaniline/polyvinyl alcohol solution with an aqueous peroxide solution.

2. The composition of claim 1, wherein the polyaniline solution contains a polyaniline prepared by a method comprising:

combining ammonium persulfate and a first acid to form a pre-polymer solution;

combining aniline and a second acid to form an aniline solution;

combining the pre-polymer solution and the aniline solution to form a polyaniline mixture; and precipitating the polyaniline.

3. The composition of claim 2 wherein the first and second acids are hydrochloric acid.

4. The composition of claim 1, wherein the acid is sulfuric acid or hydrochloric acid.

5. The composition of claim 1, wherein the polyvinyl alcohol solution comprises polyvinyl alcohol and a glycol.

6. The composition of claim 5, wherein the glycol comprises about 50% by volume water and 50% by volume ethylene glycol.

7. The composition of claim 1, wherein the aqueous polyaniline/polyvinyl alcohol solution comprises 10% by weight of the polyvinyl alcohol solution combined with the polyaniline solution.

8. A process for making an aqueous composition for treating waste matter comprising:

combining polyaniline and a base;

adding N-methyl pyrrolidone to saturation to form a polyaniline solute;

combining the polyaniline solute and an aqueous polyvinyl alcohol solution to form an aqueous polyaniline/polyvinyl alcohol solution;

combining the polyaniline/polyvinyl alcohol solution with an acid; and combining the acidic polyaniline/polyvinyl alcohol solution with an aqueous peroxide solution.

9. The process of claim 8, wherein the polyaniline solution contains a polyaniline prepared by a method comprising:

combining ammonium persulfate and a first acid to form a pre-polymer solution;

combining aniline and a second acid to form an aniline solution;

combining the pre-polymer solution and the aniline solution to for a polyaniline mixture; and precipitating the polyaniline.

10. The process of claim 2, wherein the first and second acids are hydrochloric acid.

11. The process of claim 8, wherein the polyvinyl alcohol solution is made by combining polyvinyl alcohol and a glycol.

12. The process of claim 8, wherein the acid is sulfuric acid or hydrochloric acid.

13. The process of claim 10, wherein about 5 g to 25 g of ammonium persulfate is mixed with about 300 ml of 1M hydrochloric acid.

14. The process of claim 10, wherein about 10 ml to 30 ml of aniline is mixed with about 300 ml of 1M hydrochloric acid.

15. The process of claim 9, wherein polyaniline is precipitated by a method comprising:

cooling the polyaniline mixture to about 0 degrees Celsius;

heating the polyaniline mixture to about 9 degrees Celsius; and cooling the polyaniline mixture to about 0 degrees Celsius.

16. The process of claim 15, wherein the polyaniline is further precipitated by drying under vacuum at about 50 degrees Celsius.

17. The process of claim 11, wherein the glycol comprises about 50% by volume water and 50% by volume ethylene glycol.

18. The process of claim 8, wherein about 10% by weight of the aqueous polyvinyl alcohol solution is combined with the polyaniline solute.

19. The process of claim 8, wherein about an equal volume of about 30% by volume aqueous hydrogen peroxide solution is combined with the aqueous polyaniline/polyvinyl alcohol solution.

20. The process of claim 8, wherein the acid is sulfuric acid combined at about 25% by volume.

21. The process of claim 17, wherein about 50% by weight of polyvinyl alcohol is combined with about 50% by weight of the glycol.

* * * * *